United States Patent [19]

Burrows et al.

[11] Patent Number: 4,799,562
[45] Date of Patent: Jan. 24, 1989

[54] CANTILEVER WEIGHING APPARATUS

[75] Inventors: Donald L. Burrows, Utopia; Edward J. Milne, Markham, both of Canada

[73] Assignee: Everest & Jennings Canadian Limited, Concord, Canada

[21] Appl. No.: 137,568

[22] Filed: Dec. 24, 1987

[51] Int. Cl.[4] .......................... G01G 3/08; G01G 19/52
[52] U.S. Cl. ..................................... 177/229; 177/144; 177/146
[58] Field of Search ............... 177/146, 229, 262, 263, 177/144

[56] References Cited

U.S. PATENT DOCUMENTS

| | | | |
|---|---|---|---|
| 1,030,099 | 6/1912 | Llobet . | |
| 2,818,737 | 1/1958 | Barrett et al. . | |
| 3,032,131 | 5/1962 | Schmerl | 177/146 X |
| 3,089,519 | 5/1963 | Bradley . | |
| 3,177,958 | 4/1965 | Link . | |
| 3,464,509 | 9/1969 | Gray . | |
| 3,837,416 | 9/1974 | Nozaki | 177/229 X |
| 4,064,955 | 12/1977 | Dyck . | |
| 4,170,270 | 10/1979 | Settle et al. | 177/229 X |
| 4,485,881 | 12/1984 | Tramposch et al. | 177/229 X |
| 4,655,306 | 4/1987 | Saner | 177/229 |
| 4,678,050 | 7/1987 | Wirth et al. | 177/229 |
| 4,718,507 | 1/1988 | Howlett et al. | 177/229 X |

FOREIGN PATENT DOCUMENTS 552108 11/1956 Belgium .
57-70412 4/1982 Japan .

Primary Examiner—George H. Miller, Jr.
Attorney, Agent, or Firm—Ridout & Maybee

[57] ABSTRACT

A cantilever arm weighing apparatus comprises two arm portions joined by two linkage members disposed in parallel one above the other. A load cell extends from the arm portion attached to a support structure to the arm portion which receives the weight to be measured. A bearing coacts with the load cell and the arm portion bearing the weight to receive the load from the arm portion and transfer it to the load cell. The linkage members act to nullify the moment effect and minimize losses due to friction. A readout device is attached to the load cell providing a readout of the weight applied to the load cell through the bearing.

41 Claims, 3 Drawing Sheets

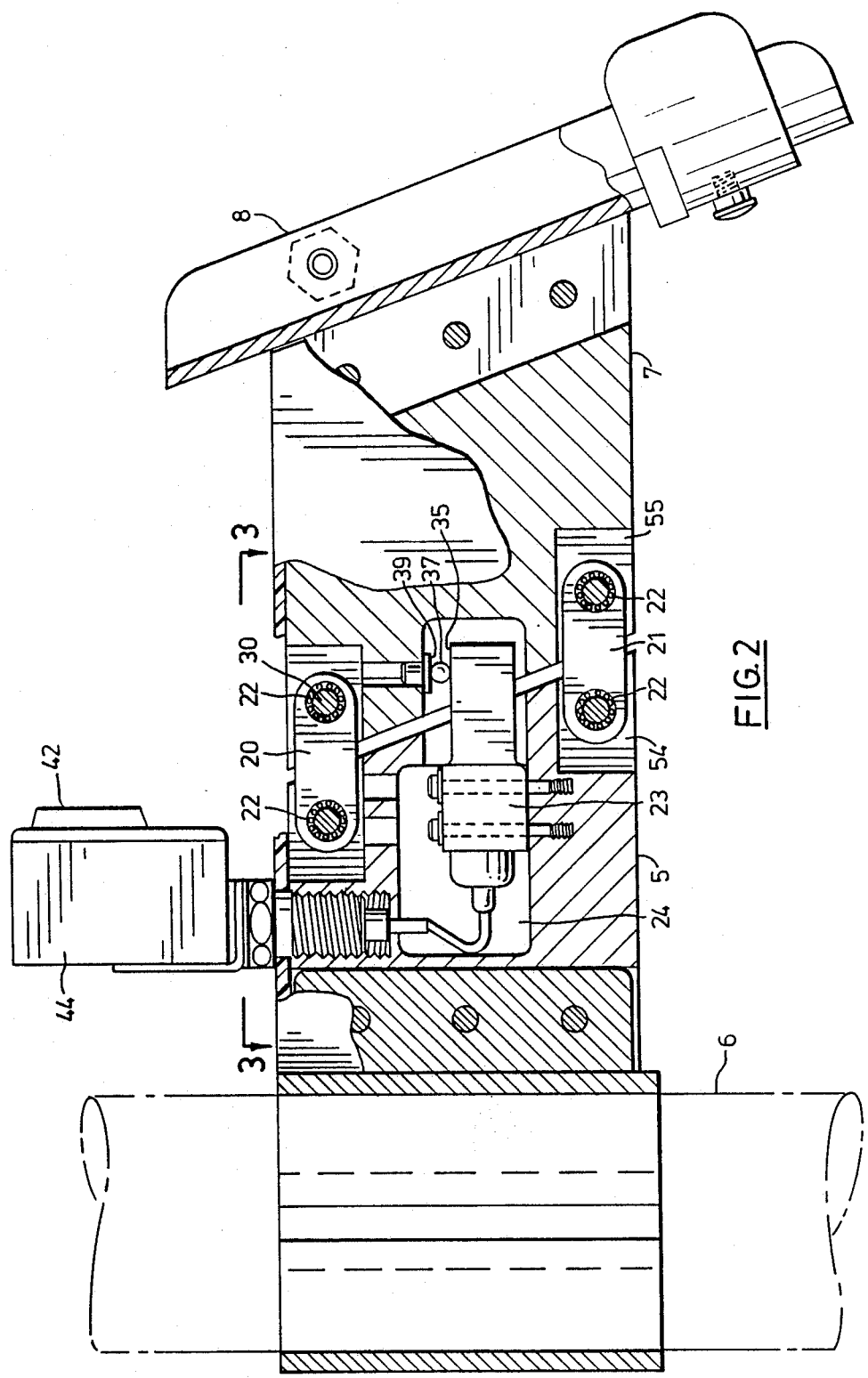

CANTILEVER WEIGHING APPARATUS

This invention is a cantilever arm weighing apparatus, and, in particular, relates to such an apparatus incorporated into hydraulic lifting devices used in association with treatment or therapy systems for elderly, injured or handicapped people.

A standard household weigh scale is not suitable for use by a person confined to bed or who cannot walk, and, therefore, must rely on a wheelchair to move about. Nursing homes and other health care facilities often are equipped with special devices to care for such people, but even in these settings suitable weighing devices are often not available.

The present invention addresses these issues by providing a weighing apparatus which is incorporated into a cantilever arm of a lifting device. Hydraulic lifting devices are used in the context of caring for bedridden or immobile patients such as in the case of lifting a patient in and out of a bathtub. A lift for use in association with a bathtub will have a support for the patient, which support may be a chair capable of being transferred to the lifting device from a wheelchair frame without the need for the patient to be physically transferred from one device to another.

Since the lifting device bears the entire weight of the patient, it has been thought for some time to be useful to incorporate some sort of weighing mechanism in such a lifting device. Previous efforts have focused on modification to the base of the lifting device rather than to the arm of the device in order to adapt the device to provide the desired weighing means. These previous efforts have proven unsatisfactory due to their lack of an acceptable level of accuracy and the general requirement for the device to be in a particular orientation in order to make a weight reading.

The present device overcomes the inadequacies inherent in the prior devices by providing a weighing mechanism in the cantilever arm of a lifting device which utilizes a linkage for two arm portions joined at the weighing mechanism, which linkage allows the entire load on the arm to be transferred vertically to the weighing mechanism while nullifying the moment effect and minimizing losses due to friction. The preferred weight mechanism is a load cell or strain gauge connected to a digital readout display unit.

The apparatus of the invention enables an accurate weighing of a patient without the need for the patient or the apparatus to be in any particular configuration or for the patient to remain perfectly still. The weighing of the patient can be accomplished quickly and conveniently in conjunction with handling the patient for some unrelated purpose, such as giving him a bath.

Accordingly, the present invention provides a cantilever arm weighing apparatus comprising a first arm portion attached to a support structure, and a second arm portion attached to the first arm portion by two linkage members disposed in parallel one above the other. Means for attaching to the second arm portion a support for an object to be weighed. A load cell is attached to the first arm portion and extends from the first arm portion to the second arm portion. Load bearing means coact with the load cell and the second arm portion to receive a load from the second arm portion and transmit it to the load cell. A readout device is attached to the load cell providing a readout in response to the load being applied to the load cell through the load bearing means.

BRIEF DESCRIPTION OF THE DRAWINGS

FIG. 2 is a sectional elevation at line 2—2 of FIG. 1.

As shown in FIG. 1, the weighing apparatus of the invention may be incorporated into a cantilever arm 4 of a lifting device 15. In the application shown in the drawings, the lifting device 15 comprises a part of a therapeutic bath system 11. The cantilever arm 4 of the lifting device 15 has a first arm portion 5 attached to an upright support 6 which is activated by hydraulic means in the pedestal 10 of the device 15 to cause the support 6 to move up or down. A second arm portion 7 is attached to the first arm portion 5 through a linkage (described below) which allows the entire load on the second arm portion 7 to be transferred vertically on the weighing mechanism.

The end of the second arm portion 7 is provided with means 8 such as a clamp for releasably attaching a chair 9 to it. The chair 9 is used to seat the patient and the releasable attachment means 8 enables the chair 9 to be used to transport the patient to and from the bath system 11 as well as to position the patient during use of the system 11. In this regard, the skilled person will be familiar with wheeled frame means which may be used in associated with the chair 9 to transport the patient to and from the bathing system 11.

Figure 1:
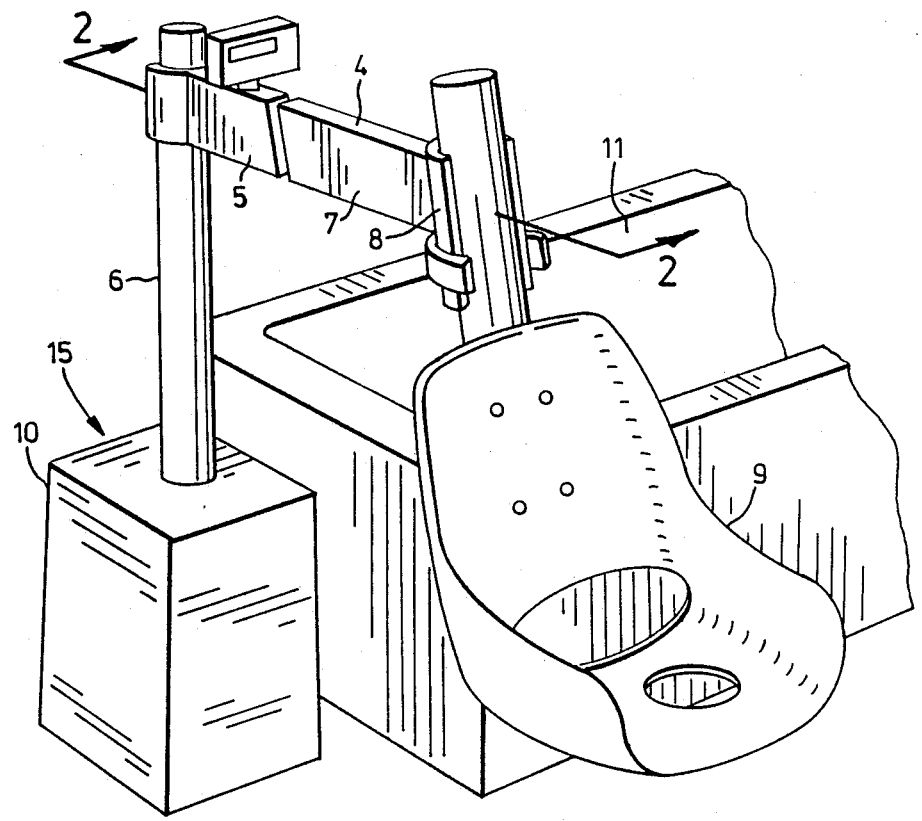
FIG. 1 is a perspective view of a preferred embodiment of the invention wherein the device is used in association with a lifting mechanism for a therapeutic bath system.
Figure 3:
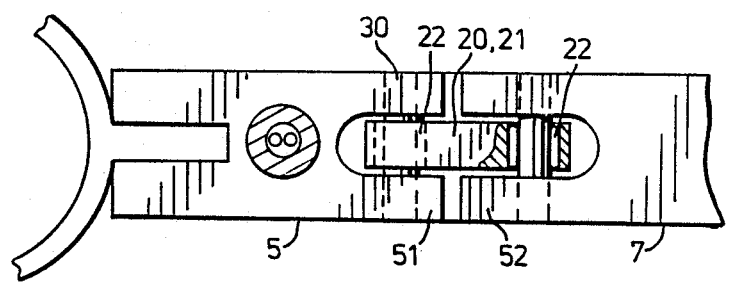
FIG. 3 is a plan view, partially broken away at line 3—3 of FIG. 2.

Referring to FIGS. 2 and 3, the weighing apparatus of the invention comprises a load cell 23 which is affixed near one end within a cavity 24 formed in the first arm portion 5. The other end of the load cell 23 extends to the second arm portion 7, where it is received within a cavity 26 formed in the second arm portion 7.

The first and second arm portions 5 and 7 are joined by linkage members 20 and 21 which are disposed in parallel one above the other. The linkage members 20 and 21 are secured in forks formed in the arm portions 5 and 7 by means of pins 30 (FIG. 3). Roller bearings 22 are provided about each aperture formed in the linkage members 20 and 21 to minimize frictional effects relating to the transfer of the load on the second arm portion 7 through the linkage members 20 and 21 to the load cell 23. The linkage of the two arm portions 5 and 7 as described is essentially a reverse four bar linkage where four linkage members are placed about the exterior of the portions being joined. In the present invention, the linkage members 20 and 21 are placed internally of the arm portions 5 and 7 being joined. Thus, as shown in FIGS. 2 and 3, the upper linkage member 20 is positioned within opposing fork portions 51 and 52 of the arm portions 5 and 7, and likewise, the lower linkage member 21 is positioned within opposing fork portions 54 and 55. The present arrangement provides the advantages of simpler construction and neater appearance without scrificing any of the strength or load transfer benefits of a conventional four bar linkage arrangeent.

A preferred load cell 23 is a strain gauge of a type readily available which converts a mechanical deformation of the weight bearnng platform 35 into an electrical signal. The load cell 23 may be bolted to the first arm portion 5 by bolts 32 which may be accessed via holes 33 formed just above them in the arm portion 5. The load on the arm portion 7 is transferred to the load cell 23 through a ball bearing 37 which is positioned to engage the weight bearing platform 35 of the load cell 23 and a pressure pad 39 of the second arm portion 7.

When a load is applied to the arm portion 7, the roller bearings 22 in each linkage member 20 and 21 serve to minimize friction induced inaccuracies associated with movement of the linkage members 20 and 21. Under a load, the second arm portion 7 will move slightly downward and laterally toward the first arm portion 5 but will remain praallel to the first portion 5 as the parallel linkage members 20 and 21 rotate under the influence of the load. The ball bearing 37 will roll over the load cell platform 35 toward the first arm portion 5, thereby eliminating the lateral force component. The moment and torsion induced in the second arm portion 7 by the load is accommodated by tension in the upper linkage member 20 and compression in the lower linkage member 21. Thus, the apparatus of the invention ensures that the load on the second arm portion 7 is applied vertically to the load cell 23.

It will be apparent to those skilled in this art that alternative load bearing means may be used to provide a result similar or identical to that achieved through the use of the ball bearing 37 described above. For example, sliding means such as lubricated surfaces or rolling means such as a contact bearing having a plurality of ball bearings in a circular recess in one of the surfaces may be suitable depending on the accuracy desired.

As mentioned, the preferred load cell 23 is a strain gauge which produces an electrical signal in response to the size of the load delivered to the weight bearing platform 35.

Figure 4:
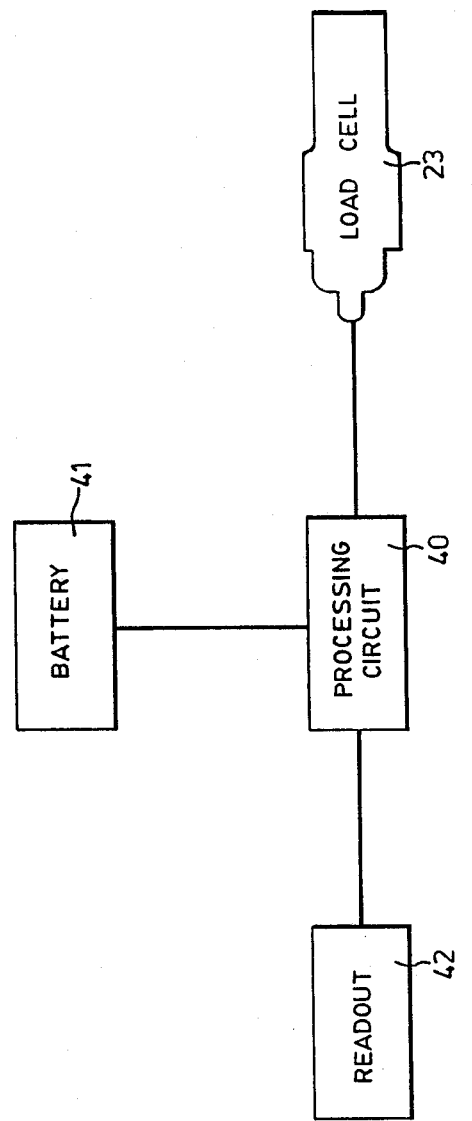
FIG. 4 is a block diagram of the electrical components.

Referring to FIG. 4, the electrical components are shown wherein a battery 41 provides the power for all functions. The load cell 23 produces an electrical signal which is received by a processing circuit 40. The circuit 40 includes means to convert the signal from metric to imperial or avoirdupois units and vice versa, means to protect the circuitry from electrical surges and means to calibrate the readout to zero, all of which are well known to those skilled in the art. The calibrated signal is transmitted from the processing circuit 40 to the digital readout device 42 where the readout is displayed. Referring to FIG. 2, the digital readout device 42, the circuit 40 and the battery 41 are housed within an electrical enclosure 44.

We claim:
1. A cantilever arm weighing apparatus, comprising:
   a first arm portion attached to a support structure;
   a second arm portion attached to the first arm portion by two linkage members disposed in parallel one above the other, said linkage members being positioned within forks formed in the first and second arm portions;
   means for attaching to the second arm portion a support an object to be weighed;
   a load cell attached to the first arm portion and extending from the first arm portion to the second arm portion;
   bearing means coacting with the load cell and the second arm portion for receiving a load from the second arm portion and transmitting it to the load cell; and
   a readout device attached to the load cell, the device providing a readout in response to a load being applied to the load cell through the bearing means.

2. A weighing apparatus as claimed in claim 1, wherein the support structure is a hydraulic lifting device.

3. A weighing apparatus as claimed in claim 1, wherein the support structure is an upright support which may be activated by power means to move the support up or down.

4. A weighing apparatus as claimed in claim 1, wherein the linkage members are attached to the arm portions with pins.

5. A weighing apparatus as claimed in claim 4, wherein a roller bearing is provided between each area of engagement of a pin with a linkage member.

6. A weighing apparatus as claimed in claim 4, wherein the linkage members are staggered relative to one another.

7. A weighing apparatus as claimed in claim 1, wherein the means for attaching a support structure to the second arm portion is a clamp.

8. A weighing apparatus as claimed in claim 1, wherein the support for an object to be weighed is a chair.

9. A weighing apparatus as claimed in claim 1, wherein the load cell is a strain gauge.

10. A weighing apparatus as claimed in claim 1, wherein the load cell is affixed near one end thereof within a cavity formed in the first arm portion, and the other end of the load cell is received within a cavity formed in the second arm portion.

11. A weighing apparatus as claimed in claim 1, wherein the bearing means is a roller bearing.

12. A weighing apparatus as claimed in claim 1, wherein the bearing means are coacting surfaces which are slidable relative to one another.

13. A weighing apparatus as claimed in claim 1, wherein the readout device comprises a processing circuit, a power supply and a digital display.

14. A weighing apparatus as claimed in claim 13, wherein the processing circuit is capable of converting the signal from the load cell to metric or avoirdupois units of weight.

15. A cantilever arm weighing apparatus, comprising:
   a first arm portion attached to a support structure;
   a second arm portion attached to the first arm portion by two linkage members disposed in parallel one above the other, said linkage members being attached to the arm portions with pins and being staggered relative to one another;
   means for attaching to the second arm portion a support for an object to be weighed;
   a load cell attached to the first arm portion and extending from the first arm portion to the second arm portion;
   bearing means coacting with the load cell and the second arm portion for receiving a load from the second arm portion and transmitting it to the load cell; and
   a readout device attached to the load cell, the device providing a readout in response to a load being applied to the load cell through the bearing means.

16. A weighing apparatus as claimed in claim 15, wherein the support structure is a hydraulic lifting device.

17. A weighing apparatus as claimed in claim 15, wherein the support structure is an upright support which may be activated by power means to move the support up or down.

18. A weighing apparatus as claimed in claim 15, wherein the two linkage members are positioned within forks formed in the first and second arm portions 19. A weighing apparatus as claimed in claim 15, wherein a roller bearing is provided between each area of engagement of a pin with a linkage member.

20. A weighing apparatus as claimed in claim 15, wherein the means for attaching a support structure to the second arm portion is a clamp.

21. A weighing apparatus as claimed in claim 15, wherein the support for an object to be weighed is a chair.

22. A weighing apparatus as claimed in claim 15, wherein the load cell is a strain gauge.

23. A weighing apparatus as claimed in claim 15, wherein the load cell is affixed near one end thereof within a cavity formed in the first arm portion, and the other end of the load cell is received within a cavity formed in the second arm portion.

24. A weighing apparatus as claimed in claim 15, wherein the bearing means is a roller bearing.

25. A weighing apparatus as claimed in claim 15, wherein the bearing means are coacting surfaces which are slidable relative to one another.

26. A weighing apparatus as claimed in claim 15, wherein the readout device comprises a processing circuit, a power supply and a digital display.

27. A weighing apparatus as claimed in claim 26, wherein the processing circuit is capable of converting the signal from the load cell to metric or avoirdupois units of weight.

28. A cantilever arm weighing apparatus, comprising:
a first arm portion attached to a support structure;
a second arm portion attached to the first arm portion by two linkage members disposed in parallel one above the other;
means for attaching to the second arm portion a support for an object to be weighed;
a load cell affixed near one end thereof within a cavity formed in the first arm portion, and the other end of the load cell being received within a cavity formed in the second arm portion;
bearing means coacting with the load cell and the second arm portion for receiving a load from the second arm portion and transmitting it to the load cell; and
a readout device attached to the load cell, the device providing a readout in response to a load being applied to the load cell through the bearing means.

29. A weighing apparatus as claimed in claim 28, wherein the support structure is a hydraulic lifting device.

30. A weighing apparatus as claimed in claim 28, wherein the support structure is an upright support which may be activated by power means to move the support up or down.

31. A weighing apparatus as claimed in claim 28, wherein the two linkage members are positioned within forks formed in the first and second arm portions.

32. A weighing apparatus as claimed in claim 28, wherein the linkage members are attached to the arm portions with pins.

33. A weighing apparatus as claimed in claim 32, wherein a roller bearing is provided between each area of engagement of a pin with a linkage member.

34. A weighing apparatus as claimed in claim 32, wherein the linkage members are staggered relative to one another.

35. A weighing apparatus as claimed in claim 28, wherein the means for attaching a support structure to the second arm portion is a clamp.

36. A weighing apparatus as claimed in claim 28, wherein the support for an object to be weighed is a chair.

37. A weighing apparatus as claimed in claim 28, wherein the load cell is a strain gauge.

38. A weighing apparatus as claimed in claim 28, wherein the bearing means is a roller bearing.

39. A weighing apparatus as claimed in claim 28, wherein the bearing means are coacting surfaces which are slidable relative to one another.

40. A weighing apparatus as claimed in claim 28, wherein the readout device comprises a processing circuit, a power supply and a digital display.

41. A weighing apparatus as claimed in claim 40, wherein the processing circuit is capable of converting the signal from the load cell to metric or avoirdupois units of weight.

* * * * *